United States Patent Office 3,500,525
Patented Mar. 17, 1970

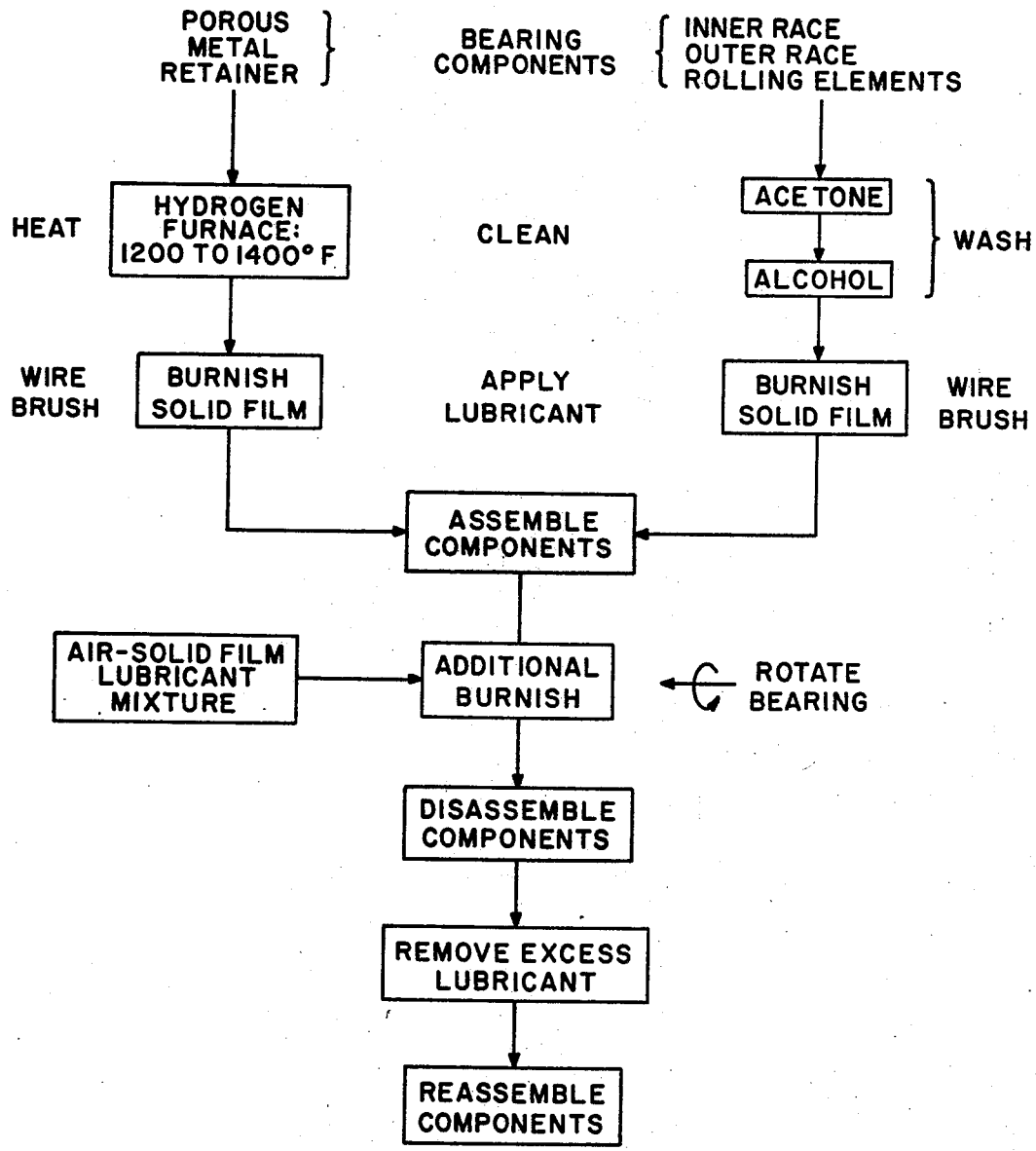

3,500,525
METHOD OF LUBRICATING ROLLING ELEMENT BEARINGS
Dean C. Glenn, League City, Tex., assignor to the United States of America as represented by the Administrator of the National Aeronautics and Space Administration
Filed Nov. 28, 1967, Ser. No. 686,344
Int. Cl. B21d 53/12
U.S. Cl. 29—148.4       5 Claims

ABSTRACT OF THE DISCLOSURE

A solid film lubricant is applied to components of rolling element bearings having porous retainers prior to use in a vacuum.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention is concerned with improved rolling element bearings for use in ultrahigh vacuum environments. The invention is particularly directed to such bearings which are capable of providing low torques and a small temperature rise during operation.

Solid lubricants have been used for lubricating rolling-element bearings in vacuum operations. The retainer or cage which was fabricated from a solid lubricating material functioned to space the rolling elements and to provide lubrication. Thin films of the retainer material were transferred to the rolling elements by the rubbing action of the elements in the retainer pocket as the bearing rotated. The lubricant was subsequently transferred by the rolling elements to the inner and outer bearing races. Materials used for such retainers were reinforced and filled plastics, such as glass filled polytetrafluoroethylene.

High bearing torques and high operating temperatures were encountered in these prior art bearings. Optical systems and electronic components malfunctioned because of contamination by the bearing lubricant.

SUMMARY OF THE INVENTION

These problems have been solved by a rolling element bearing constructed in accordance with the present invention. The bearing has rolling elements positioned by a retainer or cage fabricated from a porous metal. A solid lubricant is burnished on the components.

OBJECTS OF THE INVENTION

It is, therefore, an object of the present invention to lubricate a rolling element bearing for operation in an ultrahigh vacuum environment of about $10^{-11}$ torr.

Another object of the invention is to provide an improved rolling element bearing for operating at low torques and small temperature rises.

A method of lubricating a further object of the invention is to provide a bearing for use in an ultrahigh vacuum environment which does not require containers, baffles or labyrinths to restrict evaporative losses.

These and other objects and advantages of the invention will be apparent from the specification which follows.

DESCRIPTION OF THE DRAWING

The drawing is a flow sheet illustrating diagrammatically a process embodying the invention.

DESCRIPTION OF THE PREFERRED EMBODIMENT

A bearing made in accordance with the invention has rolling elements, such as balls or rollers, spaced by a retainer or cage. Both the rolling elements and the retainer are positioned between an outer race and an inner race in a conventional manner. The races and rolling elements are preferably fabricated from 440 stainless steel. However, other suitable bearing steels may be utilized.

In accordance with the present invention, the retainer or cage is fabricated from porous bronze or copper-tin alloy. Contaminants, such as oils or other organics, are removed from the retainer after fabrication. This is accomplished by placing the retainer in a hydrogen furnace at a temperature of 1200 to 1400° F. Care is taken to make certain that no contaminants contact with the retainer after cleaning and prior to bearing assembly. The inner race, outer race, and rolling elements are cleaned first with acetone and then with alcohol.

A solid film lubricant is then applied to all of the bearing components in preparation for vacuum operation. It has been found that burnishing with a wire brush is satisfactory for this application.

Molybdenum disulfide is preferably applied in this manner. However, other solid film lubricants may be burnished onto the components. These include molybdenum diselenide, tungsten disulfide, tungsten diselenide, niobium disulfide and niobium diselenide.

The bearing is then assembled in a conventional manner. Additional burnishing of inaccessible regions, such as the rolling element pockets in the cage, is accomplished by forcing an air-molybdenum disulfide mixture into the bearing while it is rotating.

The bearing is then disassembled, and the excess solid film lubricant powder is removed by wiping. The bearing is then reassembled for use in a vacuum environment.

What is claimed is:
1. A method of lubricating components of a bearing having rolling elements spaced by a retainer between an outer race and an inner race for use in a vacuum comprising the steps of
    heating said retainer to 1200° F. to 1400° F. to free the same from contaminants,
    cleaning said inner race, outer race, and rolling elements with acetone,
    cleaning said inner race, outer race, and rolling elements with alcohol,
    burnishing a solid film lubricant onto said bearing components,
    assembling said retainer and rolling elements between said inner and outer races,
    additionally burnishing inaccessible regions by forcing an air-solid film lubricant into the bearing subsequent to assembly of said components while said bearing is rotating,
    disassembling said bearing components,
    removing the excess solid film lubricant powder by wiping, and
    reassembling the components of the bearing for use in a vacuum environment.
2. A method of lubricating components of a bearing as claimed in claim 1 including
    fabricating the retainer component from a porous metal.
3. A method of lubricating components of a bearing as claimed in claim 2 including the step of
    fabricating the retainer from porous bronze.
4. A method of lubricating components of a bearing as claimed in claim 1 including the step of
    selecting a solid film lubricant from the group consisting of molybdenum disulfide, tungsten disulfide, and niobium disulfide.

5. A method of lubricating components of a bearing as claimed in claim 1 including the step of
   selecting the solid film lubricant from the group consisting of molybdenum diselenide, tungsten diselenide, and niobium diselenide.

References Cited

UNITED STATES PATENTS

| | | | |
|---|---|---|---|
| 2,280,886 | 4/1942 | Brace | 308—240 X |
| 2,697,645 | 12/1954 | Mitchell | 308—241 |
| 2,893,793 | 7/1959 | Ryshavy | 29—149.5 |
| 2,978,793 | 4/1961 | Lamson et al. | |
| 2,980,987 | 4/1961 | Lamson et al. | |
| 3,001,838 | 9/1961 | Lamson et al. | 308—241 X |
| 3,027,626 | 4/1962 | Murphy. | |
| 3,387,985 | 6/1968 | Huber | 29—149.5 |

THOMAS H. EAGER, Primary Examiner

U.S. Cl. X.R.

308—240, 241